(12) United States Patent
Hoshino et al.

(10) Patent No.: US 6,538,907 B2
(45) Date of Patent: Mar. 25, 2003

(54) VOLTAGE DROP DC-DC CONVERTER

(75) Inventors: Taichi Hoshino, Kyoto (JP); Eitaro Oyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/983,457

(22) Filed: Oct. 24, 2001

(65) Prior Publication Data

US 2002/0051372 A1 May 2, 2002

(30) Foreign Application Priority Data

Oct. 26, 2000 (JP) .................................... 2000-327080

(51) Int. Cl.[7] ................................................ H02M 3/18
(52) U.S. Cl. ............................................ 363/60; 327/581
(58) Field of Search ............................ 353/60, 59, 62, 353/61, 124, 74, 79; 323/282, 283, 284, 285; 327/124, 365, 581

(56) References Cited

U.S. PATENT DOCUMENTS 5,581,454 A * 12/1996 Collins ........................ 363/59
6,218,818 B1 * 4/2001 Kim ............................ 323/284

FOREIGN PATENT DOCUMENTS

| JP | 8-205524 | | 8/1996 |
| JP | 08-205524 | * | 9/1996 |

* cited by examiner

*Primary Examiner*—Rajnikant B. Patel
(74) *Attorney, Agent, or Firm*—Mattingly, Stanger & Malur, P.C.

(57) ABSTRACT

A voltage drop DC-DC converter includes a switch circuit including a plurality of switches for alternately connecting a first and second capacitors in series and in parallel in response to an output signal of an oscillator circuit oscillating at a constant frequency. An efficient voltage dropping conversion is possible by deriving a voltage divided by the first and second capacitors when the first and second capacitors are connected in series and deriving terminal voltages of the first and second capacitors when the first and second capacitors are connected in parallel. When the derived voltage is increased beyond an aimed reference output voltage, the oscillation of the oscillator circuit is stopped.

14 Claims, 2 Drawing Sheets

VOLTAGE DROP DC-DC CONVERTER

BACKGROUND OF THE INVENTION

1. Field of the Invention

The present invention relates to a voltage drop DC-DC converter and, in particular, to a voltage drop DC-DC converter for use as a power source circuit of a portable telephone set of such as PHS (Personal Handyphone System) or other portable telephone system or a portable electronic device such as electronic book or PDA (Personal Digital Assistance), which DC-DC converter is high efficiency with low noise and occupies a small area.

2. Description of the Prior Art

In a conventional battery-powered electronic device such as portable telephone set of a portable telephone system or a portable electronic device, an operating voltage thereof is lowered in order to reduce power consumption thereof and, recently, such battery-powered electronic device is operated with a 1.8V power source since a LSI mounted thereon is operated with a 3V power source. On the other hand, the development of LSI operating with a 1.5 V power source has been started most recently.

Incidentally, an output voltage of a power source such as a lithium ion battery to be used in an electronic device of such kind is in a range from 3.0V to 4.2V and is usually about 3.6 V.

The operating voltage of such LSI is usually obtained by dropping a battery voltage. In the conventional series regulator including a transistor for dropping a battery voltage, voltage-dropping efficiency is as low as about 50%.

On the other hand, the voltage-dropping efficiency of a voltage-dropping circuit constructed with a charge-pump circuit and a voltage-dropping transistor is 50% or higher. Therefore, such voltage-dropping circuit has been used as a power source circuit of a battery-powered electronic device.

A conventional voltage drop DC-DC converter of switched capacitor type, which is an example of such voltage-dropping circuit, is disclosed in JP H8-205524A.

FIG. 3 shows a construction of the disclosed voltage drop DC-DC converter. In FIG. 3, a voltage converting circuit 9 of the voltage drop DC-DC converter includes a capacitor C1, a capacitor C2, switches SWa, SWb and SWc and a switch control circuit 8 for switching a connection of the capacitors C1 and C2 between a series connection and a parallel connection.

The voltage converting circuit 9 operates to charge the capacitors C1 and C2 having substantially the same capacitance with power of an input voltage Vin when the capacitors are connected in series by on-off switching of the switches SWa and SWb under control of the switch control circuit 8. After the capacitors C1 and C2 are charged, the series connection of the capacitors C1 and C2 is changed to a parallel connection by controlling the switches SWa, SWb and SWc to obtain a voltage across the capacitor C1 as well as the capacitor C2, which is substantially a half of the charged voltage Vin across the series circuit of the capacitors C1 and C2. The thus obtained voltage Vin/2 is transferred to a power capacitor C3 to charge the latter and a power of the charge capacitor C3, that is, charges of the capacitor C3, is outputted externally from an output terminal 9A of the voltage converting circuit 9. Incidentally, a reference numeral 9B in FIG. 3 depicts an input terminal to which the input voltage Vin is applied.

The output voltage at the output terminal 9A of the voltage converting circuit 9 is dropped by a MOSFET Q, which is applied to an output terminal 11A of the DC-DC converter as an output voltage Vout. A gate of the MOSFET Q is connected to an output terminal of a differential amplifier 7 and the output voltage Vout is controlled by an output voltage of the MOSFET Q. The differential amplifier 7 has a plus input terminal supplied with a reference voltage Vref from a reference voltage generator circuit 6 and a minus input terminal supplied with the output voltage from the output terminal 11A of the DC-DC converter and performs a control for making the output voltage Vout at the output terminal 11A becomes equal to the reference voltage Vref.

Although the output voltage Vout at the output terminal 11A of the DC-DC converter is a detection voltage in this case, the voltage converting circuit 9 may output a constant voltage obtained by dividing the voltage Vout by a voltage dividing circuit as the detection voltage.

In such voltage drop DC-DC converter of switched capacitor type, however, there is problems of necessity of a power transistor as the voltage dropping transistor circuit, difficulty of obtaining conversion efficiency of 90% or higher and heat generation and increased area of a power source circuit.

According to this voltage drop DC-DC converter of switched capacitor type, it may be possible to regulate the output voltage by directly controlling the switches for changing the connection of the capacitors by the voltage converting circuit 9, without using the voltage dropping transistor. In such case, however, it is necessary in order to stabilize the output voltage Vout of the DC-DC converter to control the switching frequency or switching period-of the switch control circuit 8. Since, in such control, the switching is performed before the charging of the capacitors is completed, there is a problem that noise may be generated on the output voltage Vout.

SUMMARY OF THE INVENTION

An object of the present invention is to provide a voltage drop type DC-DC converter, which is high efficiency with reduced noise generation and occupies a small area.

In order to achieve the above object, the voltage drop DC-DC converter according to the present invention is featured by comprising a first and second capacitors, an oscillator circuit for generating a signal having a specific frequency, a switch circuit including a plurality of switches for alternately connecting the first and second capacitors in series and in parallel in response to the output signal of the oscillator circuit, a DC power source for charging the first and second capacitors with a DC voltage when the first and second capacitors are connected in series, an output terminal for deriving a junction voltage at a junction point of the first and second capacitors when the first and second capacitors are connected in series and deriving a terminal voltage of the first and second capacitors when the first and second capacitors are connected in parallel and a comparator for comparing the voltage at said output terminal with a predetermined reference voltage and generating a signal for stopping the oscillation of said oscillator circuit when the voltage at said output terminal is larger than the reference voltage, wherein the first and second capacitors are connected in parallel when the oscillation of the oscillator circuit is stopped.

In the present invention, it is possible to effectively drop a power source voltage by providing the switch circuit including the plurality of switches for alternately connecting the first and second capacitors in series and in parallel in response to the output signal of the oscillator circuit oscillating at the specific frequency and by deriving the junction voltage at the junction point of the first and second capacitors when the first and second capacitors are connected in series and deriving the terminal voltage of the first and second capacitors when the first and second capacitors are connected in parallel.

Further, since the control of the oscillator circuit, when the aimed voltage is increased beyond the reference output voltage, is to merely stop the oscillation, there is no need of providing a voltage drop transistor, generation of noise and heat of the power source circuit is restricted and an area occupied by the voltage drop DC-DC converter can be small.

As a result, the voltage drop DC-DC converter of the present invention can provide effects of high efficiency, low noise, small heat generation and small occupation area.

DETAILED DESCRIPTION OF THE PREFERRED EMBODIMENTS

Figure 1:
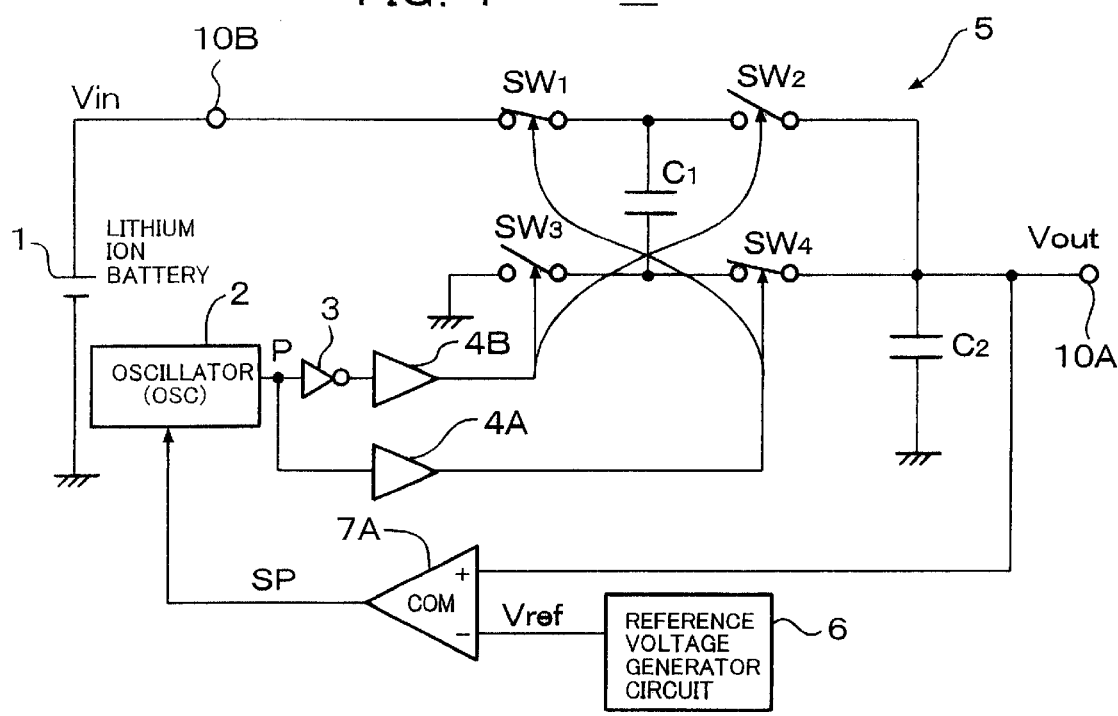
FIG. 1 is a block diagram of a voltage drop DC-DC converter of switched capacitor type, according to an embodiment of the present invention.
Figure 3:
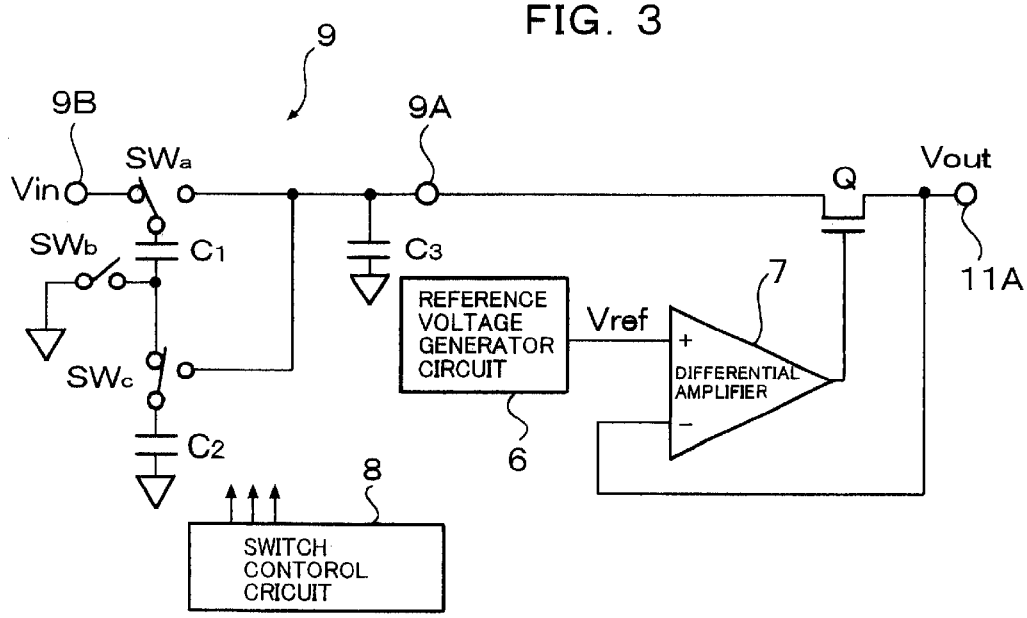
FIG. 3 is a schematic block diagram of an example of a conventional voltage drop DC-DC converter of switched capacitor type.

In FIG. 1 in which same constructive components as those shown in FIG. 3 are depicted by same reference numerals, respectively, a voltage drop DC-DC converter 10 of switched capacitor type, which is driven by a lithium ion battery 1, includes an oscillator circuit (OSC) 2, an inverter 3, driver circuits 4A and 4B, a voltage drop charge pump circuit 5, a reference voltage generator circuit 6, a comparator 7A and an output terminal 10A from which a regulated output voltage Vout is derived. A reference numeral 10B indicates an input terminal inputted with an input voltage Vin from the lithium ion battery 1. The circuit components from the input terminal 10B to the output terminal 10A are formed as an IC.

As shown in FIG. 1, the voltage drop transistor Q shown in FIG. 3 is removed and, instead thereof, an output SP of the comparator 7A of the DC-DC converter 10 is supplied to the oscillator circuit 2. The comparator 7A has a minus input terminal supplied with a reference voltage Vref from the reference voltage generator circuit 6 and a plus input terminal, which is connected to the output terminal 10A of the DC-DC converter 10 and provides the output voltage Vout.

With this circuit construction, the comparator 7A generates a high level signal (H) when the output voltage Vout is higher than the reference voltage Vref, upon which the oscillation of the oscillator circuit 2 is stopped.

In the DC-DC converter 10 of the present invention, the output voltage Vout at the output terminal 10A is used as a detection voltage. Alternatively, it is possible to divide the output voltage Vout by a voltage divider circuit and use a resultant voltage divided at a constant ratio as the detection voltage. In the latter case, the reference voltage Vref generated by the reference voltage generator circuit 6 becomes a low voltage corresponding to the constant dividing ratio.

The voltage drop charge pump circuit 5 corresponds to the voltage converter 9 shown in FIG. 3 and functions to switch the connection of capacitors C1 and C2 between a series connection and a parallel connection by on-off switching of switches SW1, SW2, SW3 and SW4.

One terminal of the capacitor C1 of the voltage drop charge pump circuit 5 is connected to a positive side (Vin) of the battery 1 through the switch SW1 and to the output terminal 10A through the switch SW2. The other a terminal of the capacitor C1 is connected to a negative side of the battery 1 through a ground line and to the output terminal 10A through the switch SW4. The switches SW1, SW2, SW3 and SW4 are constructed with MOSFET's, which are formed as an IC.

One terminal of the capacitor C2 of the voltage drop charge pump circuit 5 is connected to the output terminal 10A and the other terminal thereof is connected to the negative side of the battery 1 through the ground line.

The switches SW1 and SW4 respond to an output pulse P having duty cycle of about 50% and supplied from the oscillator circuit 2 through the driver circuit 4A and are normally OFF except a period during which the output pulse P is "H". The switches SW2 and SW3 are normally OFF except a period during which the output pulse P is "L". Therefore, the switches SW2 and SW3 are ON/OFF switched complementarily to the switches SW1 and SW4.

Therefore, in the case where the output pulse P of the oscillator circuit 2 is "H", the capacitors C1 and C2 are connected in series when the switches SW1 and SW4 are in ON state and, in the case where the output pulse P of the oscillator circuit 2 is "L", the capacitors C1 and C2 are connected in parallel when the switches SW2 and SW3 are in ON state. As a result, the output voltage at the output terminal 10A becomes slightly lower than a half of the output voltage Vin of the battery 1. In this embodiment, the reference voltage Vref is set to a voltage (=Vin/2−α) slightly lower than Vin/2. Assuming that the output voltage of the battery 1 is, for example, 3.8V, the reference voltage Vref is 1.8V (<1.9V) and the output voltage Vout is stabilized to 1.8V. Incidentally, the battery voltage is not always limited to 3.8V and is usually selected from the range from 3.0V to 4.2V. However, the battery voltage range is not limited to this range.

An operation of the whole DC-DC converter of the present invention will be described.

The switching of the connection of the capacitors between the series connection and the parallel connection is started by the pulse output of the oscillator circuit 2 and the output voltage Vout at the output terminal 10A is dropped to a value (≈Vin/2−α) by dropping the battery voltage Vin to substantially a half. Incidentally, α is a regulation voltage, which may be in a range from 0.05V to 0.5V when the battery voltage Vin is in the range from 4.2V to 3.0V.

When the output voltage Vout becomes higher than Vin/2−α, in other words, when the output voltage Vout becomes higher than the reference voltage Vref, the comparator 7A generates an output pulse SP, which is in H level. In response to the output pulse SP, the oscillator circuit 2 stops to operate and the output pulse P of the oscillator circuit 2 becomes "L".

When the oscillator circuit 2 stops to operate, the output pulse P thereof is maintained in the level "L", so that the switches SW2 and SW3 are kept in ON state and the switches SW1 and SW4 are kept in OFF state. Therefore, the parallel connection of the capacitors C1 and C2 is maintained. Consequently, charge on the parallel capacitors charged by the battery 1 appears on the output terminal 10A and, then, is discharged. The voltage at the output terminal 10A is reduced by this discharge. When the output voltage Vout becomes a value slightly lower than Vin/2–α, the output pulse SP from the comparator 7A is stopped and the oscillation of the oscillation circuit 2 is restarted. Therefore, the capacitors C1 and C2 are connected in series and charged. As a result, the control is performed such that the output voltage Vout is maintained at Vin/2–α (=1.8V). That is, the aimed voltage to be stabilized is Vin/2–α corresponding to the reference voltage Vref.

In the described embodiment, the oscillation frequency of the oscillator circuit 2 is set to a constant value, with which the switching of the switches is performed after the charging of the capacitors C1 and C2 is completed. The voltage drop charge pump circuit 5 always performs a reliable voltage dropping operation with the charging operation of the capacitors C1 and C2 being completed. Therefore, switching noise appearing on the output voltage Vout is restricted.

Figure 2:
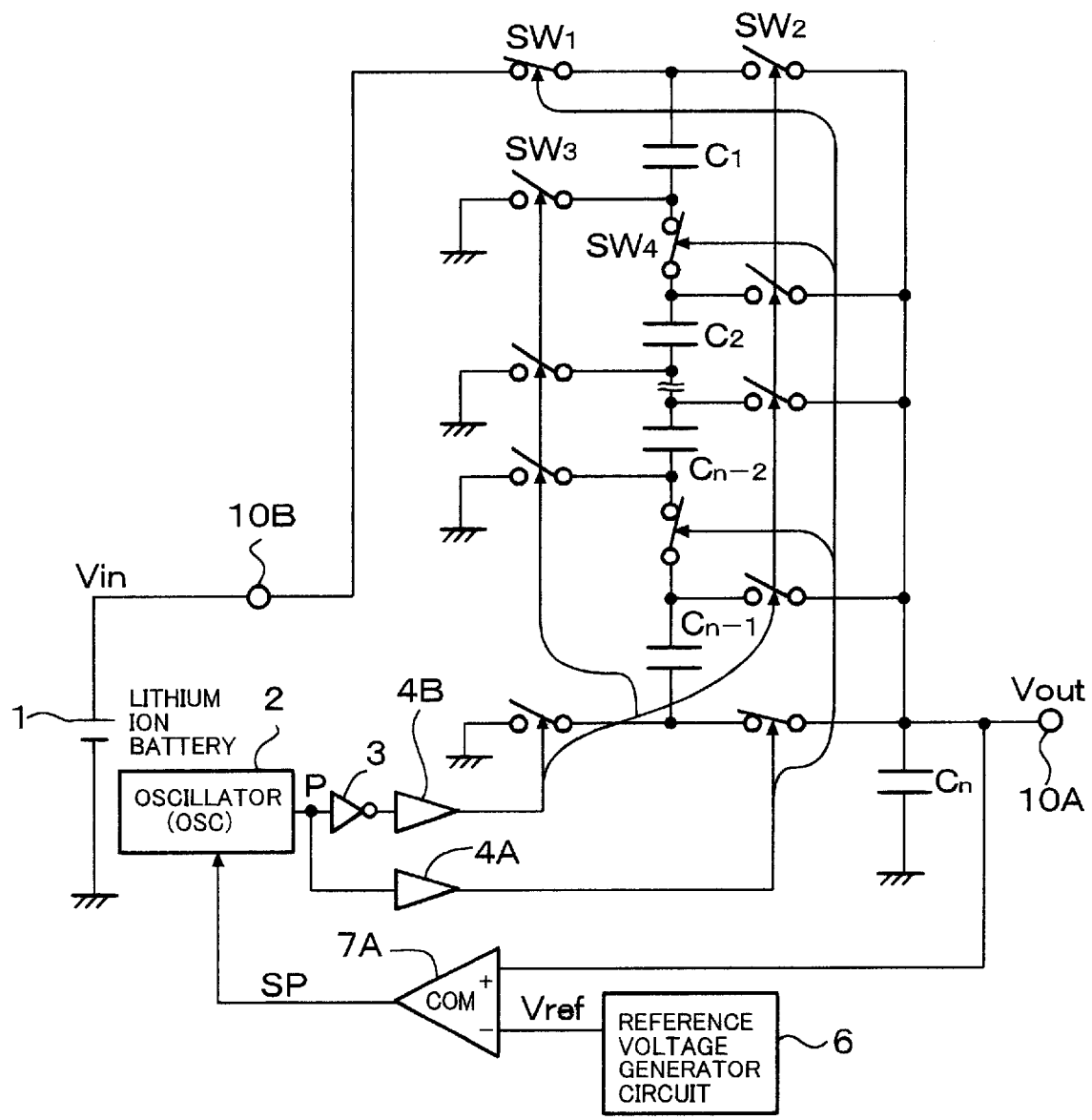
FIG. 2 is a block diagram of a voltage drop DC-DC converter of switched capacitor type, according to another embodiment of the present invention.

As described hereinbefore, the DC-DC converter 10 according to the present invention performs the voltage reduction by half. However, by the DC-DC converter 100 using n capacitors (where n is an integer larger than 2) as shown in FIG. 2, switching n capacitors to form a series connection of them and complementarily switching them to form a parallel connection of them, the DC-DC converter 100 can regulate the output voltage to a value slightly lower than Vin/n. When the n capacitors are connected in series in the latter case, a junction of the series connection of the capacitors, a voltage at which is the lowest one of voltages divided by the capacitors, is connected to the output terminal.

Although the capacitors C1 and C2 have substantially equal capacitances, it is possible to output an arbitrarily dropped voltage by selecting capacitances of them.

Further, although the battery is used as the DC power source in the described embodiment, the DC power source may be realized by a DC power source circuit for generating DC power by rectifying AC power, etc.

What is claimed is:

1. A voltage drop DC-DC converter comprising:
    first and second capacitors;
    an oscillator circuit for generating a signal having a specific frequency;
    a switch circuit including a plurality of switches for alternately connecting said first and second capacitors in series and in parallel in response to the output signal of said oscillator circuit;
    a DC power source for charging said first and second capacitors with a DC voltage when said first and second capacitors are connected in series;
    an output terminal for deriving a junction voltage at a junction point of said first and second capacitors when said first and second capacitors are connected in series and deriving a terminal voltage of said first and second capacitors when said first and second capacitors are connected in parallel; and
    a comparator for comparing the voltage at said output terminal with a predetermined reference voltage and generating a signal for stopping the oscillation of said oscillator circuit when the voltage at said output terminal is larger than the reference voltage,
    wherein said first and second capacitors are connected in parallel when the oscillation of said oscillator circuit is stopped.

2. A voltage drop DC-DC converter as claimed in claim 1, wherein said DC power source. is a battery, the specific frequency of said oscillator circuit is constant, the reference voltage is lower than a half of the DC voltage and said first and second capacitors and said switch circuit constitute a charge pump circuit.

3. A voltage drop DC-DC converter as claimed in claim 2, wherein said first and second capacitors have substantially the same capacitance.

4. A voltage drop DC-DC converter as claimed in claim 3, wherein the reference voltage substantially corresponds to a stabilized, aimed voltage and the reference voltage is slightly lower than a half of the DC voltage.

5. A voltage drop DC-DC converter as claimed in claim 3, wherein the output voltage is detected through a resistive voltage dividing circuit.

6. A voltage drop DC-DC converter as claimed in claim 4, wherein the plurality of said switches of said switch circuit are constituted with MOS transistors, respectively, and are complementarily switched ON/OFF.

7. A voltage drop DC-DC converter as claimed in claim 6, wherein the plurality of said switches include a first, second, third and fourth switches, one terminal of said first capacitor is connected to a positive side of said battery through said first switch and to said output terminal through said second switch, the other terminal of said first capacitor is connected to a negative side of said battery through said third switch and a ground line and to said output terminal through said fourth switch, one terminal of said second capacitor is connected to said output terminal and the other terminal of said second capacitor is connected to said negative side of said battery through said ground line.

8. A voltage drop DC-DC converter comprising:
    first and second capacitors;
    an oscillator circuit for generating a signal having a specific frequency;
    a DC power source;
    a switch circuit including a plurality of switches for alternately connecting said first and second capacitors in series and in parallel in response to the output signal of said oscillator circuit;
    an output terminal for deriving a junction voltage at a junction point of said first and second capacitors when said first and second capacitors are connected in series and deriving a terminal voltage of said first and second capacitors when said first and second capacitors are connected in parallel; and
    a comparator for comparing the voltage at said output terminal with a predetermined reference voltage and generating a signal for stopping the oscillation of said oscillator circuit when the voltage at said output terminal is larger than the reference voltage,
    wherein said first and second capacitors charge with a DC voltage by the DC power source when said first and second capacitors are connected in series, and said first and second capacitors are connected in parallel when the oscillation of said oscillator circuit is stopped.

9. A voltage drop DC-DC converter as claimed in claim 8, wherein said first and second capacitors have substantially the same capacitance and said comparator for comparing the voltage at said junction point or the terminal voltage with a predetermined reference voltage and generating said signal for stopping the oscillation of said oscillator circuit when the junction voltage or the terminal voltage is larger than the reference voltage.

10. A voltage drop DC-DC converter comprising:
    n capacitors, where n is an integer larger than 2;
    an oscillator circuit for generating a signal having a specific frequency;

a switch circuit including a plurality of switches for alternately connecting said n capacitors in series and in parallel in response to the output signal of said oscillator circuit;

a DC power source for charging said n capacitors with a DC voltage when said n capacitors are connected in series;

an output terminal for deriving a lowest voltage among voltages at junction points of said n capacitors when said n capacitors are connected in series and deriving a terminal voltage of said n capacitors when said n capacitors are connected in parallel; and a comparator for comparing the voltage at said output terminal with a predetermined reference voltage and generating a signal for stopping the oscillation of said oscillator circuit when the voltage at said output terminal is larger than the reference voltage, wherein said n capacitors are connected in parallel when the oscillation of said oscillator circuit is stopped.

11. A voltage drop DC-DC converter as claimed in claim 10, wherein said DC power source is a battery, the specific frequency is constant, the reference voltage is lower than one n-th the DC voltage and said n capacitors and said switch circuit constitute a charge pump circuit.

12. A voltage drop DC-DC converter as claimed in claim 11, wherein said n capacitors have substantially the same capacitance and the reference voltage is slightly lower than one n-th the DC voltage.

13. A voltage drop DC-DC converter comprising:

n capacitors, where n is an integer larger than 2;

an oscillator circuit for generating a signal having a specific frequency;

a switch circuit including a plurality of switches for alternately connecting said n capacitors in series and in parallel in response to the output signal of said oscillator circuit;

a DC power source;

an output terminal for deriving a lowest voltage among voltages at junction points of said n capacitors when said n capacitors are connected in series and deriving a terminal voltage of said n capacitors when said n capacitors are connected in parallel; and a comparator for comparing the voltage at said output terminal with a predetermined reference voltage and generating a signal for stopping the oscillation of said oscillator circuit when the voltage at said output terminal is larger than the reference voltage, wherein said first and second capacitors charge with a DC voltage by the DC power source when said n capacitors are connected in series, and said n capacitors are connected in parallel when the oscillation of said oscillator circuit is stopped.

14. A voltage drop DC-DC converter as claimed in claim 13, wherein said n capacitors have substantially the same capacitance and said a comparator for comparing the lowest voltage at said junction point or the terminal voltage with a predetermined reference voltage and generating said signal for stopping the oscillation of said oscillator circuit when the junction voltage or the terminal voltage is larger than the reference voltage.

* * * * *